(12) United States Patent
Cordes

(10) Patent No.: US 9,107,488 B1
(45) Date of Patent: Aug. 18, 2015

(54) HOLDER FOR TABLET DEVICE

(71) Applicant: Patrick G. Cordes, Yorba Linda, CA (US)

(72) Inventor: Patrick G. Cordes, Yorba Linda, CA (US)

( * ) Notice: Subject to any disclaimer, the term of this patent is extended or adjusted under 35 U.S.C. 154(b) by 0 days.

(21) Appl. No.: 14/304,126

(22) Filed: Jun. 13, 2014

Related U.S. Application Data

(60) Provisional application No. 61/836,947, filed on Jun. 19, 2013.

(51) Int. Cl.
*A45F 5/00* (2006.01)
*F16M 13/06* (2006.01)

(52) U.S. Cl.
CPC ............. *A45F 5/00* (2013.01); *F16M 13/06* (2013.01); *A45F 2200/0525* (2013.01)

(58) Field of Classification Search
CPC . A45F 5/00; A45F 2200/0525; G06F 1/1626; F16M 13/04; F16M 13/06
USPC ........... 294/142, 165; 40/710, 719, 777, 790, 40/791; 206/320; 361/679.3, 679.55, 361/679.56
See application file for complete search history.

(56) References Cited

U.S. PATENT DOCUMENTS

| | | | | | |
|---|---|---|---|---|---|
| 760,381 | A | * | 5/1904 | Callery et al. | 40/653 |
| 1,904,318 | A | * | 4/1933 | Lehere | 40/791 |
| 4,724,956 | A | * | 2/1988 | Ozeki | 206/307 |
| 6,726,070 | B2 | * | 4/2004 | Lautner | 224/221 |
| 8,885,338 | B1 | * | 11/2014 | Simpson et al. | 361/679.59 |
| 2004/0173482 | A1 | * | 9/2004 | Nieves | 206/320 |
| 2008/0192410 | A1 | * | 8/2008 | Kumar | 361/679 |
| 2012/0187706 | A1 | * | 7/2012 | Kannaka | 294/137 |
| 2012/0224318 | A1 | * | 9/2012 | Carleton | 361/679.26 |
| 2013/0069381 | A1 | * | 3/2013 | Sakamoto | 294/142 |
| 2013/0249227 | A1 | * | 9/2013 | Lin | 294/142 |
| 2014/0285968 | A1 | * | 9/2014 | Budge | 361/679.56 |

* cited by examiner

*Primary Examiner* — Dean Kramer
(74) *Attorney, Agent, or Firm* — Larry K. Roberts

(57) ABSTRACT

A holder for a tablet device. An exemplary embodiment of the holder includes a base plate structure formed with cleats on opposed sides of the base plate and a stop surface extending from a top surface of the base plate structure. The cleats on the opposed sides are spaced apart by a distance wider than a width dimension of the tablet device with the cleat underside spaced above the top surface by a second distance which is larger than a height dimension of the tablet device. A mounting system is configured to mount the tablet device to the base plate structure, the system including the cleats, the stop surface and a shim or spacer.

18 Claims, 12 Drawing Sheets

HOLDER FOR TABLET DEVICE

CROSS-REFERENCE TO RELATED APPLICATION

This application claims priority under 35 USC 119(e) from provisional application No. 61/836,947, filed Jun. 19, 2013, the entire contents of which application is incorporated herein by this reference.

BACKGROUND

Tablet devices are widely popular for a variety of applications, and are now marketed by a variety of manufacturers in different sizes and footprints. The devices can function as handheld computers, with built-in wireless (Wi-Fi) and cell radios. The displays may be touch sensitive. Examples of tablet devices include the iPad marketed by Apple, Inc., to name only the most popular at this time. Tablets may be used as e-readers, as web surfing devices, as point-of-sale intake devices in retail shops or restaurants, as video display devices for watching videos, just to name a few exemplary applications.

For many users and applications, it is desirable to be able to handle the device with one hand, to place the tablet device on a stand or flat onto a table surface without damage. While many covers are available, they typically do not enhance the handling of the device.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
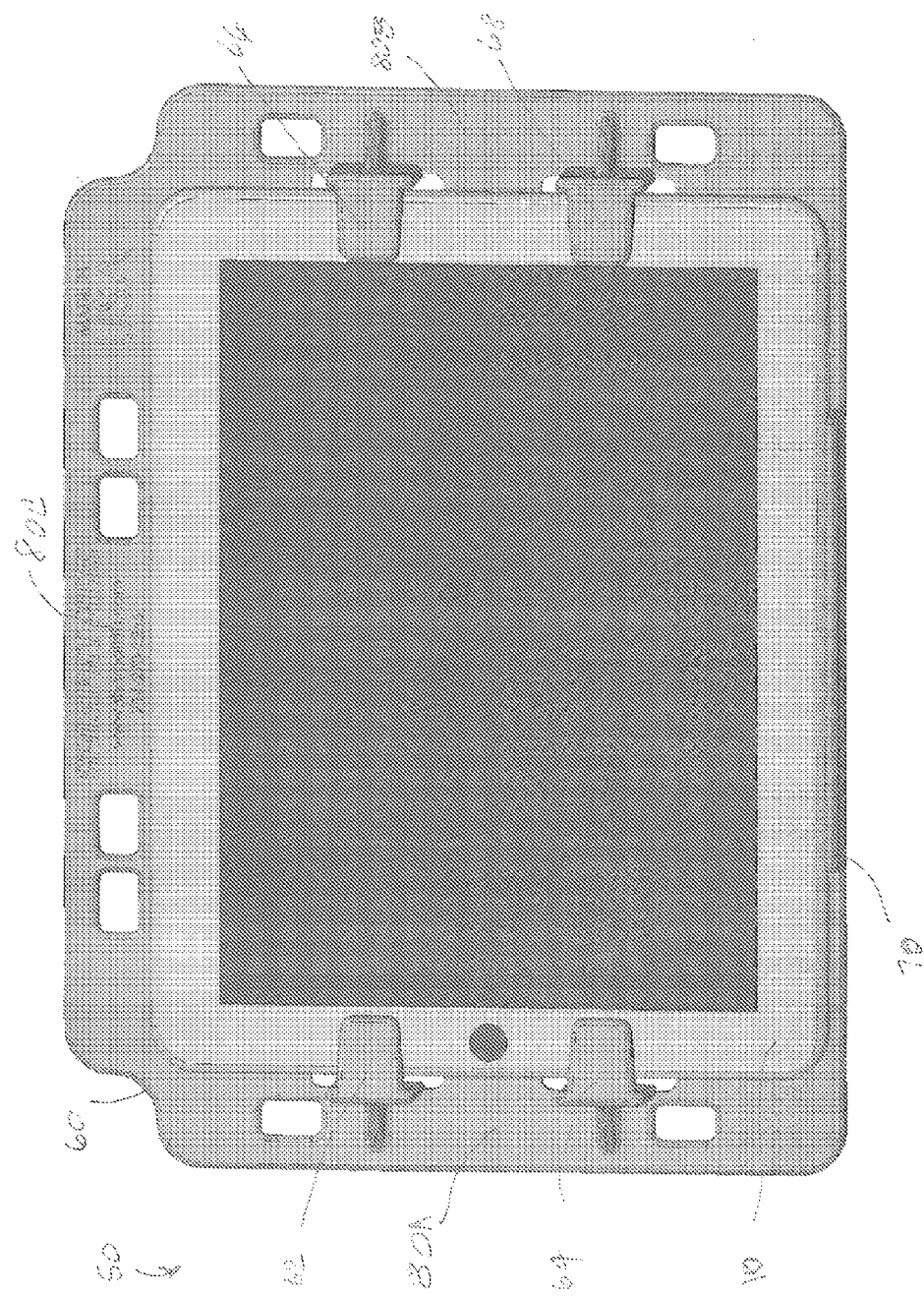
FIG. 1 is a top view of an exemplary embodiment of a holder for a tablet device, with a representation of a tablet device in place on the holder.

In the following detailed description and in the several figures of the drawing, like elements are identified with like reference numerals. The figures are not to scale, and relative feature sizes may be exaggerated for illustrative purposes.

An exemplary embodiment of a holder 50 for a tablet device 10 is illustrated in FIGS. 1-6. The holder 50 includes a base plate or frame 60, which is formed with cleats 62, 64, 66, 68 and a stop 70. A friction mounting system is provided to mount the tablet device 10 to the base plate, using the cleats and a shim or spacer 72. The base plate includes handle surfaces 80A, 80B and 80C at areas outside the tablet footprint on the holder to facilitate handling the tablet during use, and to provide ambidextrous handling functions.

Grabber pads 74 are attached to the tablet contacting surfaces of the cleats, to hold the device securely, and one or more spacers 72 may be used to create device contact with the grabber pads. Varying spacer or grabber pad thicknesses may be utilized to allow for variable tablet device thicknesses, enabling the holder 50 to accommodate different tablets of a range of thicknesses. The grabber pads may include an adhesive layer on one side to attach to the underside of the cleats. The grabber pads may include an elastomeric or felt pad configured to contact the bezel of the tablet device. The undersurface of the cleat may be formed with a shallow recess to locate the grabber pad.

The cleats and grabber pads make for a very simplistic and easy transition, whether it is to convert for opposite hand usage or to remove the tablet completely from the base plate.

Tablet holder features in accordance with aspects of this invention include one or more of the following:
1. Friction mounting system for tablet devices using:
   a. Cleats with grabber pads (i.e. footpads);
   b. Shims (spacers, inserts, etc.).
2. Tabs on multiple sides (for "handles").
3. A tablet "stop" on one side and cleats on two sides that are opposite of each other and transverse to the side with the "stop."
4. One piece frame or base plate.
5. Convertible for either left or right handed use.
6. Raised base plate to accommodate easy retrieval.
7. Holes in tabbed area to accommodate suspension of device.
8. Holes in frame base plate to accommodate tablet features (camera, microphone, etc.).
9. Base plate made from recyclable materials (polycarbonate at this time for its durability and flexibility).
10. The base plate legs may be used to attach to a separate frame for various uses such as a document camera or display support.

Figure 3:
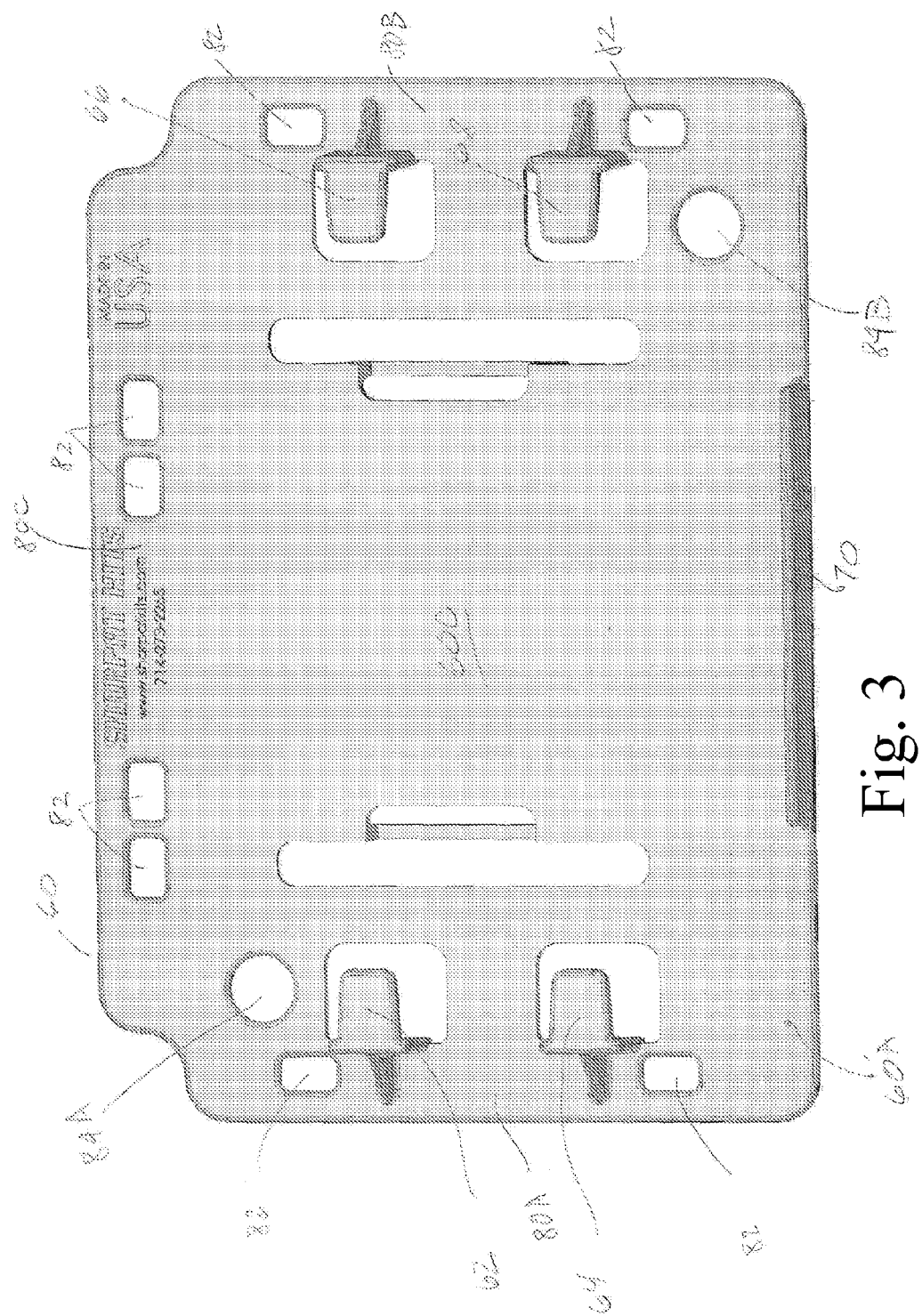
FIG. 3 is a top view of the holder of FIG. 1, with the tablet device removed.
Figure 4:
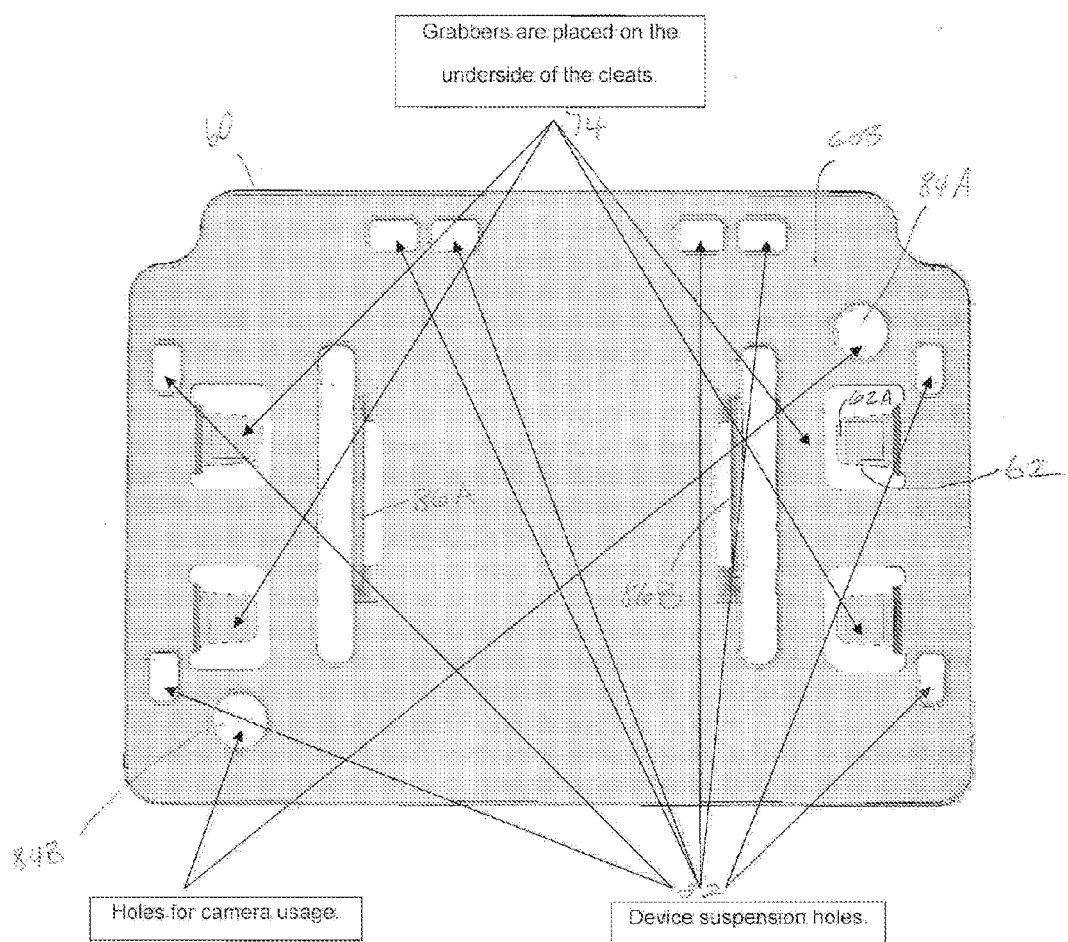
FIG. 4 is a bottom view of the holder of FIG. 1, with the tablet device removed.
Figure 5:
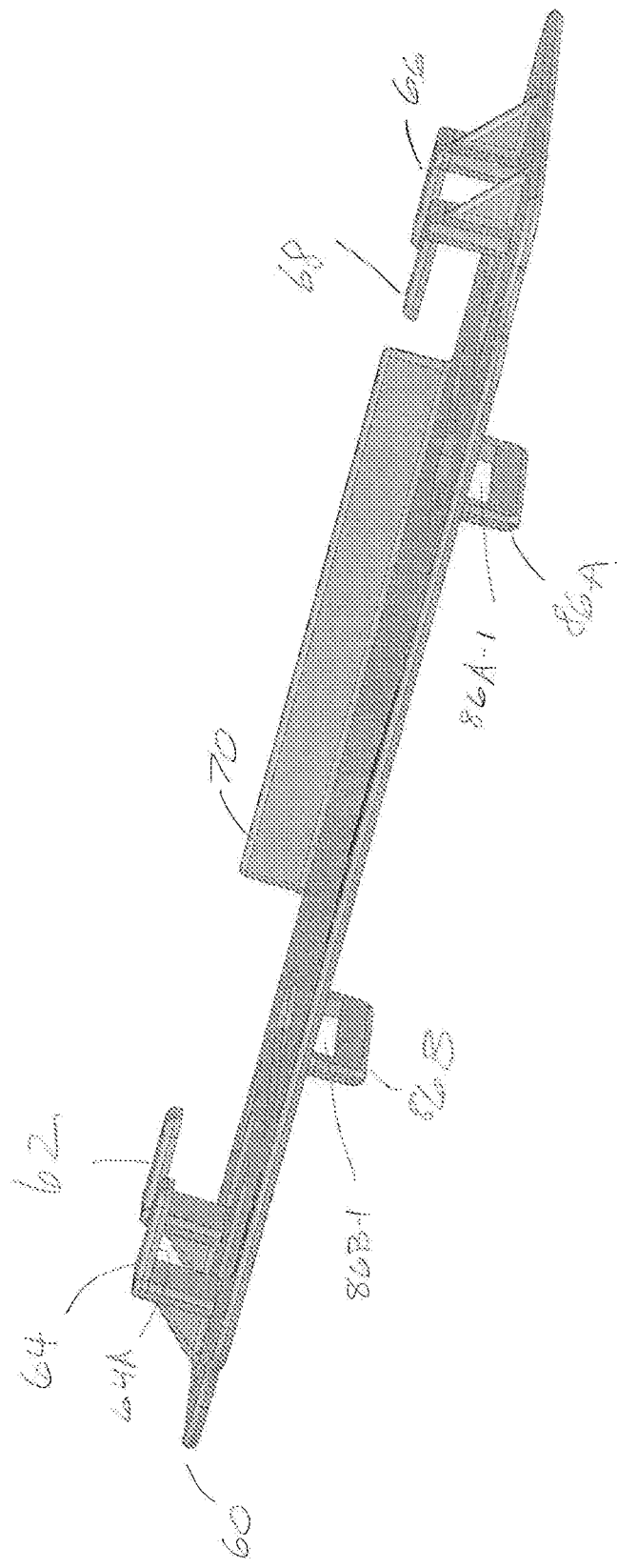
FIG. 5 is a side isometric view of the holder of FIG. 1, with the tablet device removed.
Figure 6:
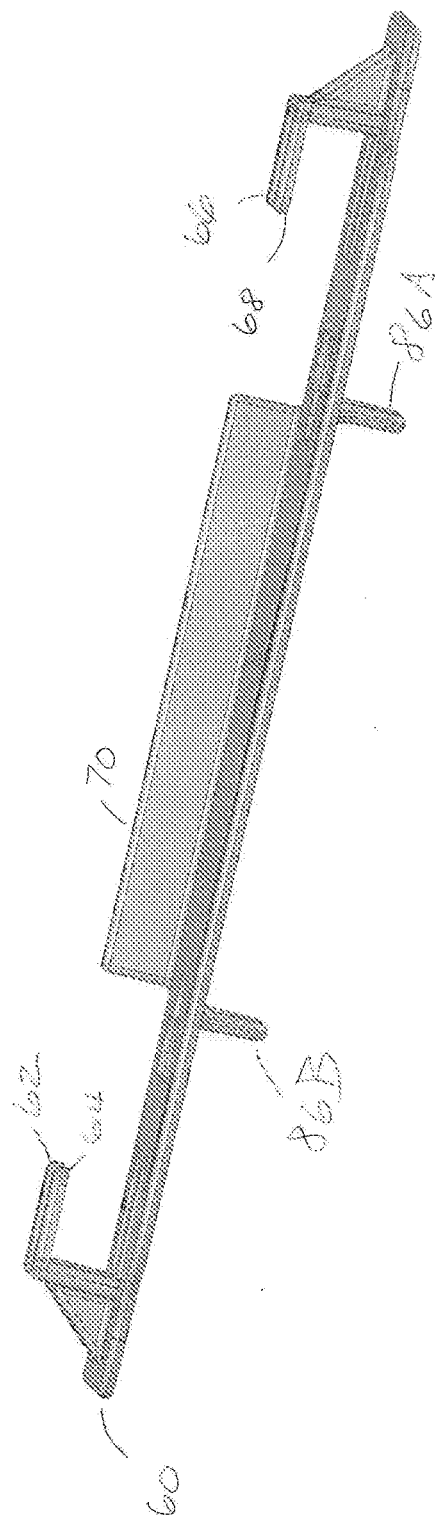
FIG. 6 is a front isometric view of the holder of FIG. 1, with the tablet device removed.

The base plate 60 has an upper surface 60A and a lower surface 60B. The upper surface includes a generally flat area 60C (FIG. 3). The base plate is generally oversized with respect to the footprint of the tablet device, with pairs of cleats protruding upwardly from left and right sides of the upper surface 60A. Thus, cleats 62 and 64 protrude upwardly from the left side, and cleats 66 and 68 protrude upwardly from the right side of the upper surface of the base plate. The cleats are dimensioned to provide an underside cleat surface, e.g. surface 62A on cleat 62, raised above the top surface 60A by a sufficient distance such that the edge bezel of the tablet will fit under the cleat surface with the grabber pad attached.

A stop surface 70 protrudes from a lower edge of the base plate top surface, in a generally perpendicular or transverse relationship to the top surface 60A, and between the pairs of cleats on the left side and right side of the base plate. The stop surface is generally parallel to the bottom edge of the tablet when mounted to the holder.

A series of holes 82 are formed around the left, top and right edges of the base plate, to function as suspension holes, to receive tabs or bracket ends to support the base plate and device from another support. These suspension holes 82 are outside the cleats on the left and right sides, and above the top edge of the tablet when attached to the holder. Camera apertures 84A and 84B are formed in the base plate, at suitable preselected locations to match the camera position on the tablet device, in either installed position, so that the camera lens of the tablet will be exposed through the camera aperture when the tablet is mounted to the holder. Of course, additional camera holes or slots may be provided to match with more than one tablet device.

Spaced stand-off legs 86A and 86B protrude from the bottom surface of the base plate 60, and serves to raise the bottom surface 60B from a table surface. Each leg has a slot (86A-1 or 86B-1) formed therein, and the slots may accept a support member to attach the holder to another system, e.g. a document scanner support system.

In an exemplary embodiment, the base plate structure 60 is fabricated of an injection moldable material, such as polycarbonate, and is formed as a unitary one-piece structure.

Figure 2A:
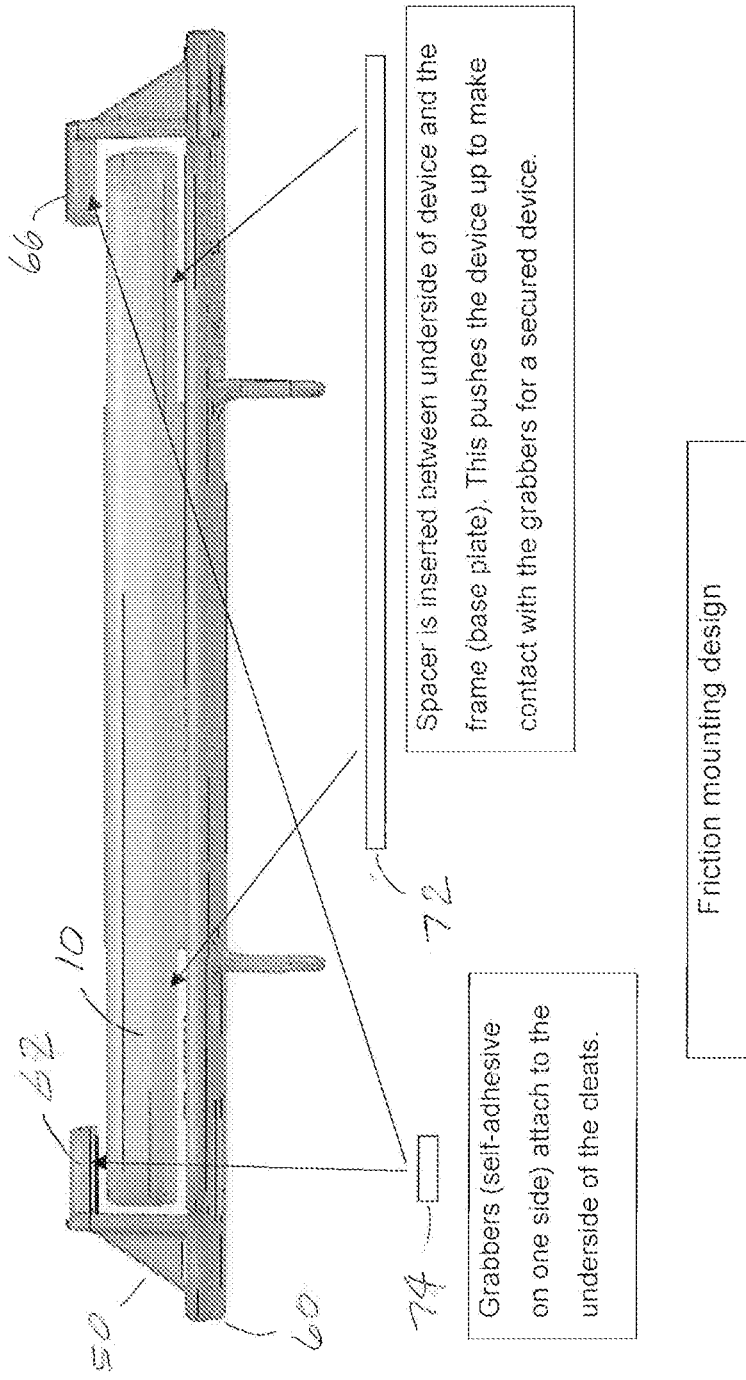
FIG. 2A is a diagrammatic side view of the holder of FIG. 1, with the tablet device positioned within the frame defined by the holder base plate, cleats and stop surface, with grabber pads and the spacer shown in exploded view.
Figure 2B:
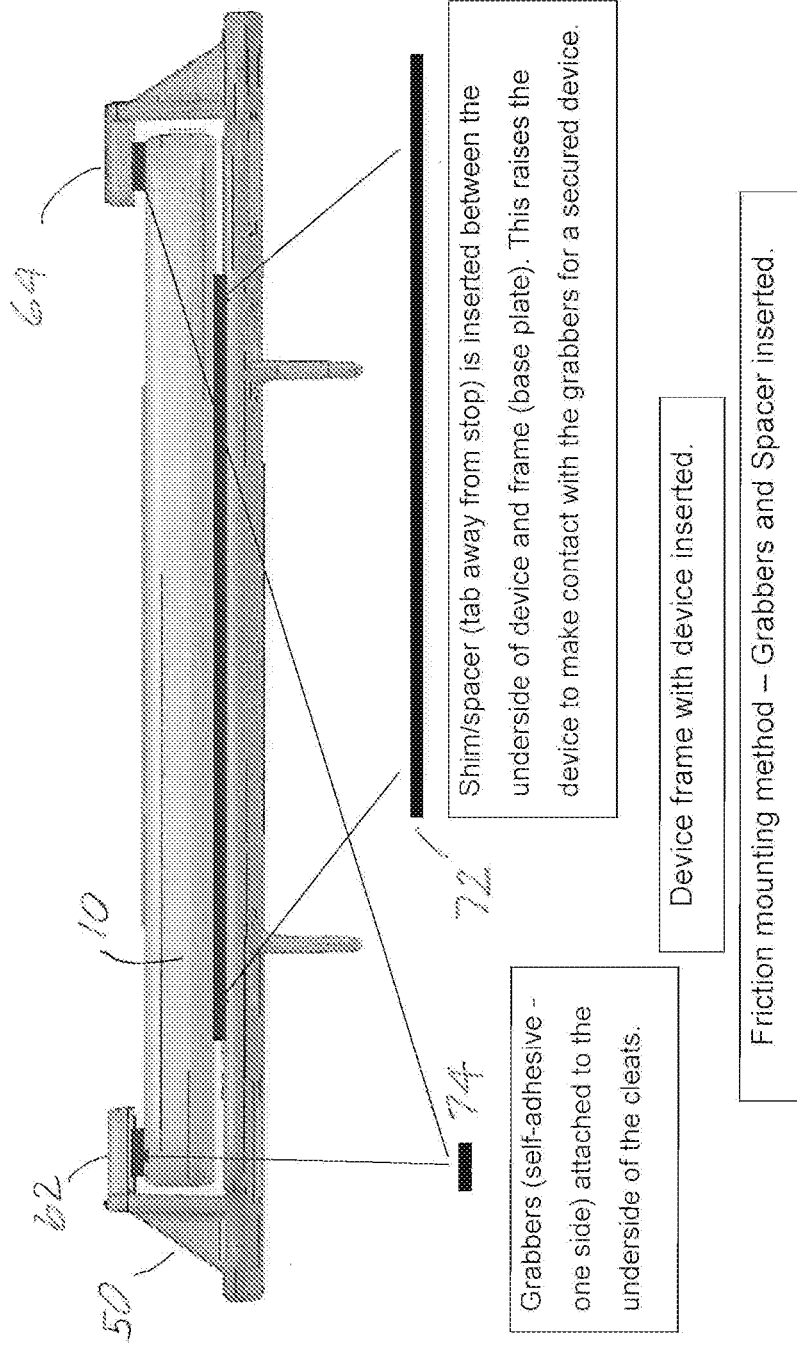
FIG. 2B is a view similar to FIG. 2A, but showing the grabber pads and spacer in position to secure the tablet device.

FIG. 2A shows the friction mounting of the tablet 10 in the holder 50, with the grabber pads 74 and spacer 72 shown in exploded form. The grabber pads 74 are attached to the underside surfaces of the cleats as illustrated. With the tablet inserted in place between the left and right side cleat pairs and its bottom edge positioned against the stop 70, the spacer 72 will be inserted between the top surface 60A of the base plate and the bottom surface of the device, thus pushing the device up to make contact with the grabber pads to prevent the device from sliding out from the base plate. FIG. 2B shows the grabber pads 74 attached to the undersurface of the cleats and the spacer 72 in position under the tablet 10, in the secured position.

Figure 2C:
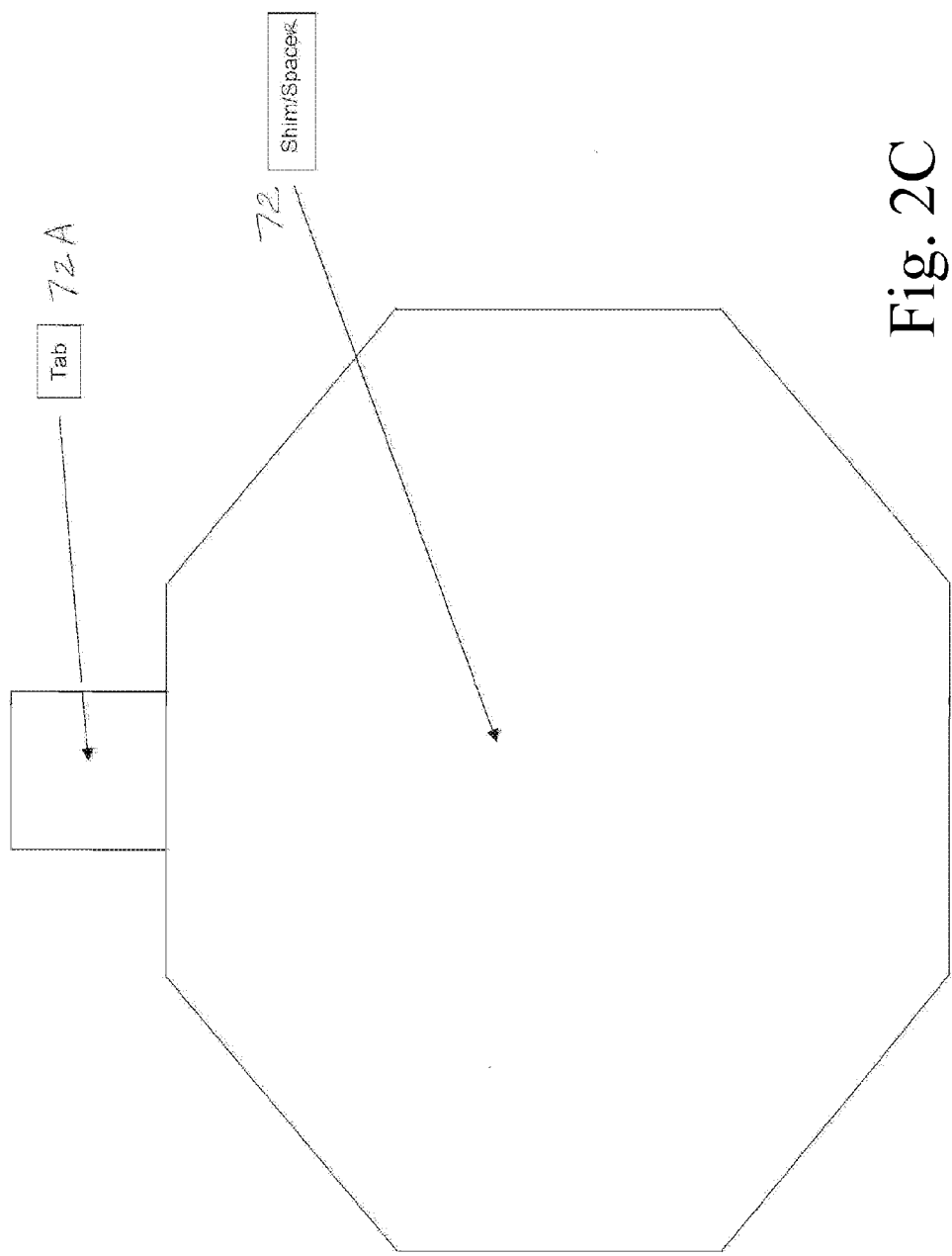
FIG. 2C is a top view of an exemplary embodiment of a spacer used with the holder.

The spacer 72 may be a thin flat plate, in an exemplary embodiment, fabricated from a corrugated plastic sheet. In another embodiment, the spacer may take the form of a tapered shim. For an exemplary application, a 4 mm (0.16 inch) thick corrugated plastic sheet sold under the trademark COROPLAST is suitable for the use, although other materials may also be used. FIG. 2C shows an exemplary spacer 72, which in this embodiment is about 6 inches long and 5 inches wide, with a tab 72A protruding from one side to facilitate removing the spacer from the holder 50. The tab 72A may be thicker than the spacer body which fits under the tablet, to assist in inserting and removing the spacer. For this example, to fit a tablet device having a thickness of about 0.5 inch, the undersurface of each cleat is about 0.875 inch above the top surface 60A of the base plate 60. The grabber pads 74 may have a thickness of 0.125 inch when installed in a recess 0.06 inch deep formed on the undersurface of the cleat. The grabber pads may be thinner or thicker, depending on the material of the pads and the other dimensions, e.g. the device thickness and the spacer thickness.

FIG. 1 shows the tablet device inserted for left hand use. This allows the user to hold the holder at the handle area 80C with the left hand while not obscuring any of the display area. This makes for a more secure method of holding the device while freeing up the user's other hand for other things such as controlling the tablet device or some other instructional/demonstration task. For right hand usage, the device is rotated 180° and inserted into the holder as for the left hand use.

Figure 7:
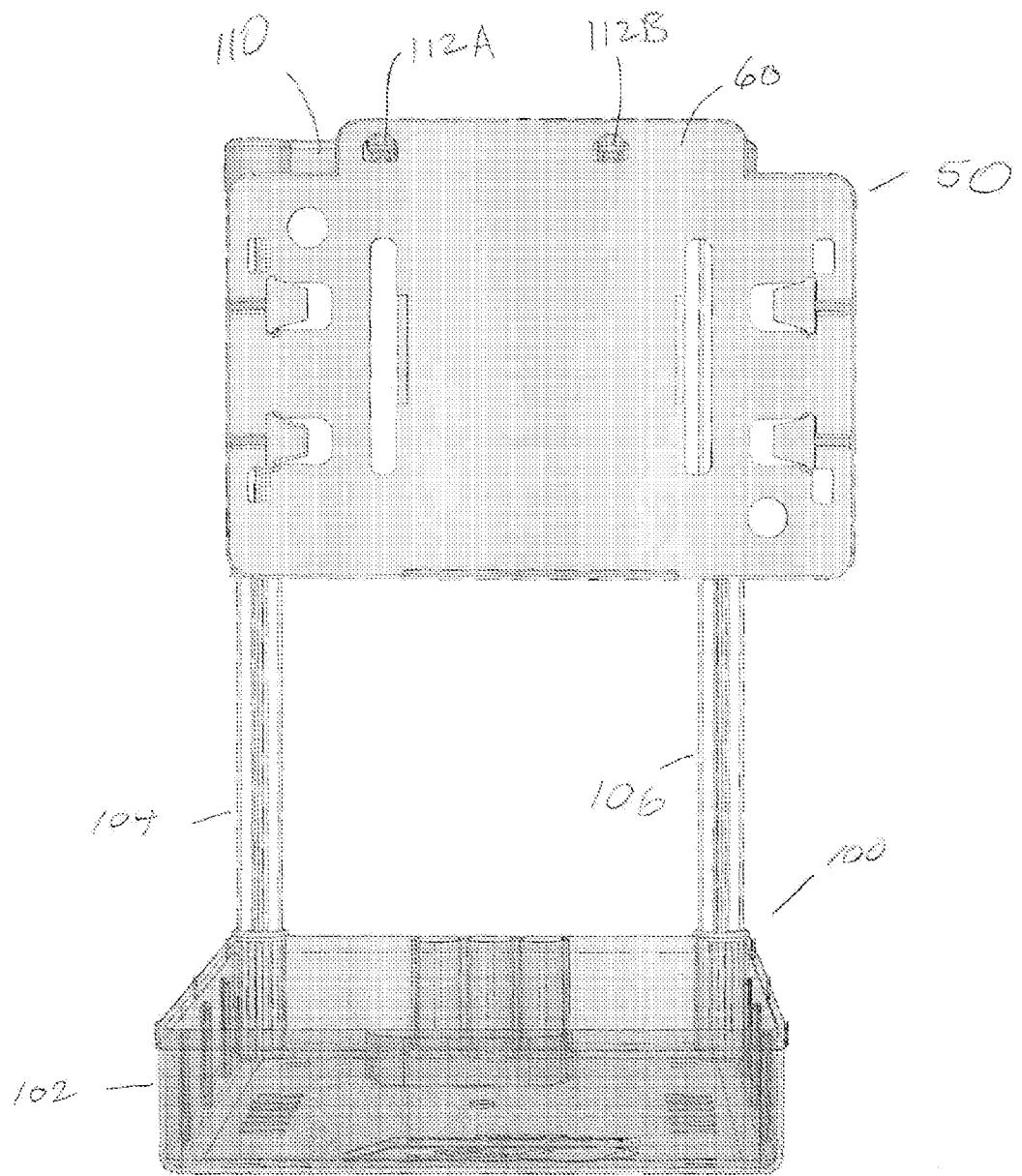
FIG. 7 is an isometric view illustrating an exemplary embodiment of a support structure for supporting the tablet holder in a vertical orientation.

FIG. 7 is an isometric view illustrating an exemplary embodiment of a stand system 100 for holding the tablet holder in an elevated position relative to a table or base surface. Embodiments of a stand system which may be adapted to the purpose are illustrated in pending application Ser. No. 13/451,899, for a "Scan Stand System for Image Capture," filed Apr. 20, 2012, the entire contents of which are incorporated herein by this reference. Generally, the stand system 100 includes a base 102, in the form of a box-like structure post support receptacles in corners, which support respective posts 104 and 106. The posts may be telescoping to adjust the height, and the top ends are attached to a lateral bracket member 110. The lateral bracket member 110 has spaced hook-like protrusions 112A, 112B, which are spaced apart and configured to engage with suspension holes 82 formed in the base plate 60 of the holder 50, to support the holder in a vertical orientation. This may be useful for applications in which the tablet is being used as a display tool, for example.

Figure 8A:
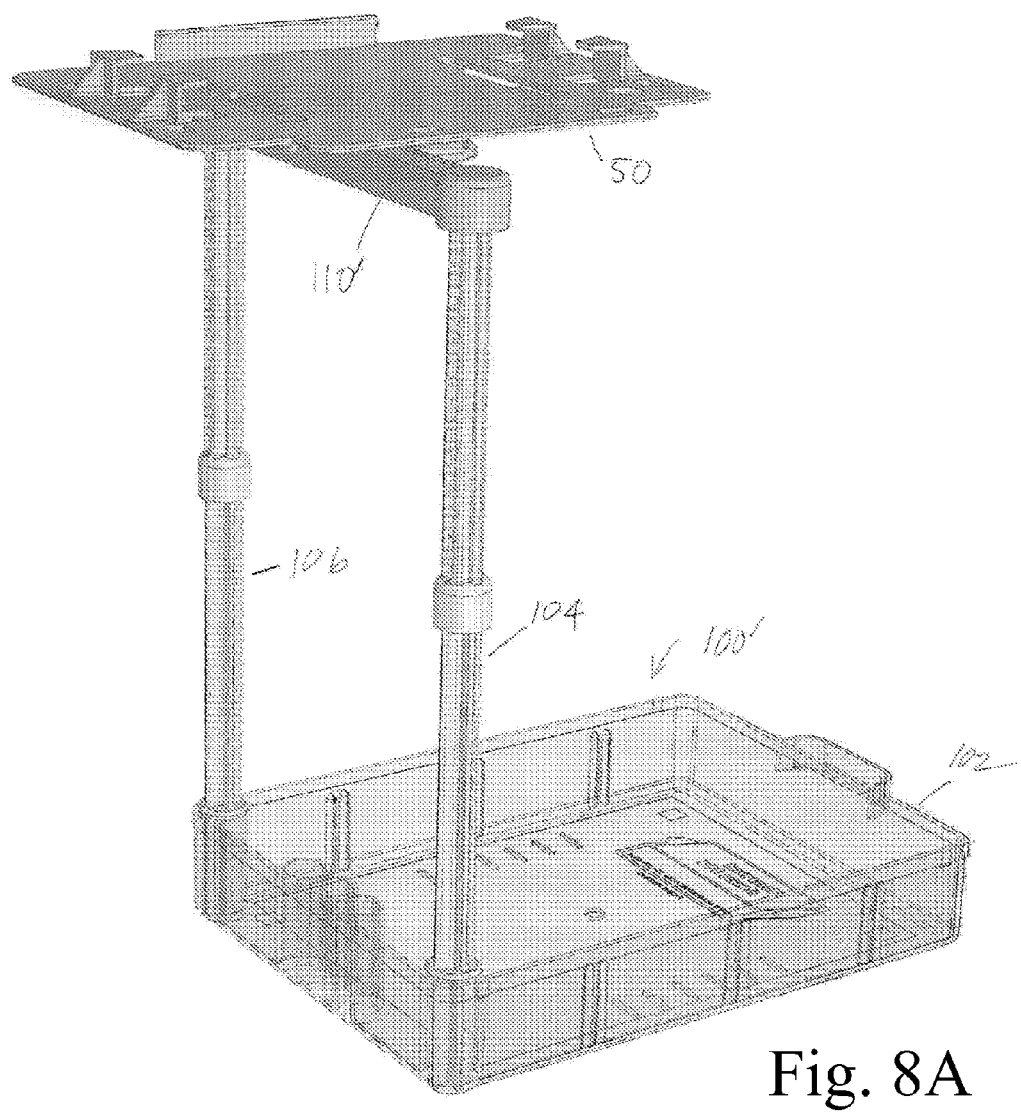
FIGS. 8A-8C are isometric views illustrating an exemplary embodiment of a support structure for supporting the tablet holder in a horizontal orientation.
Figure 8B:
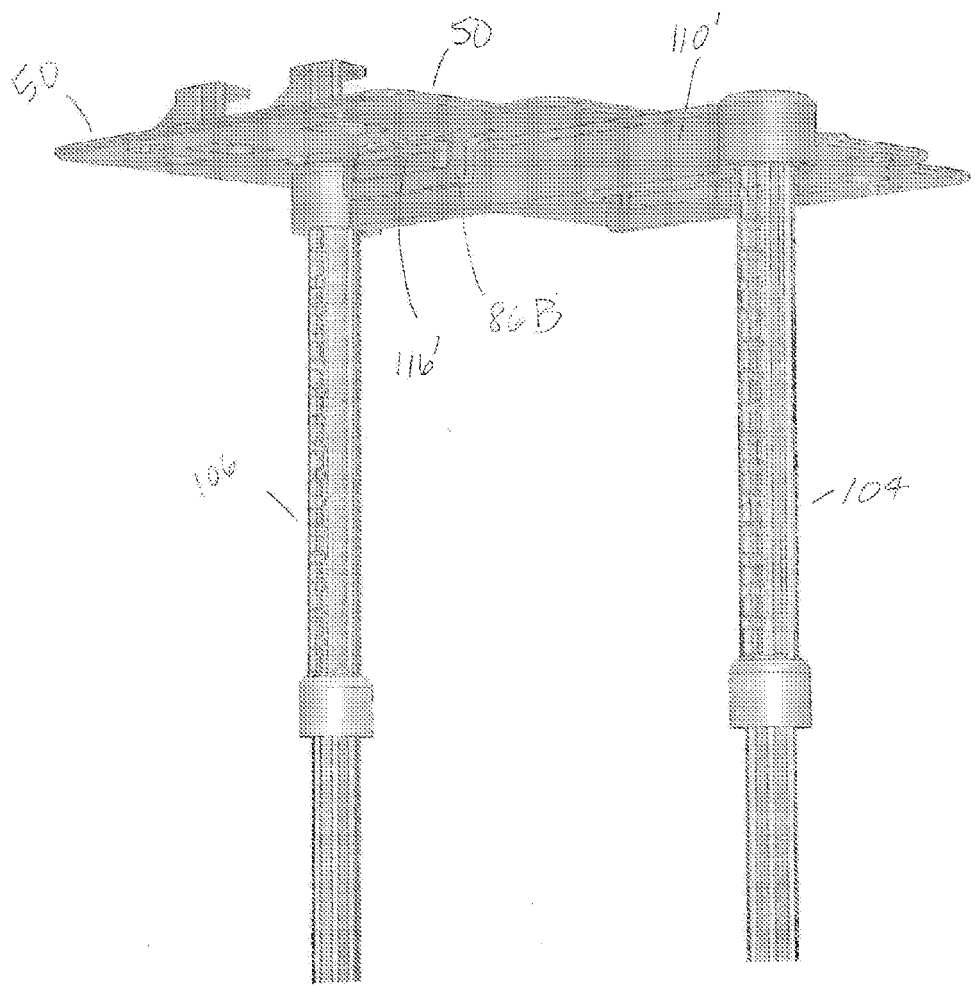
Figure 8C:
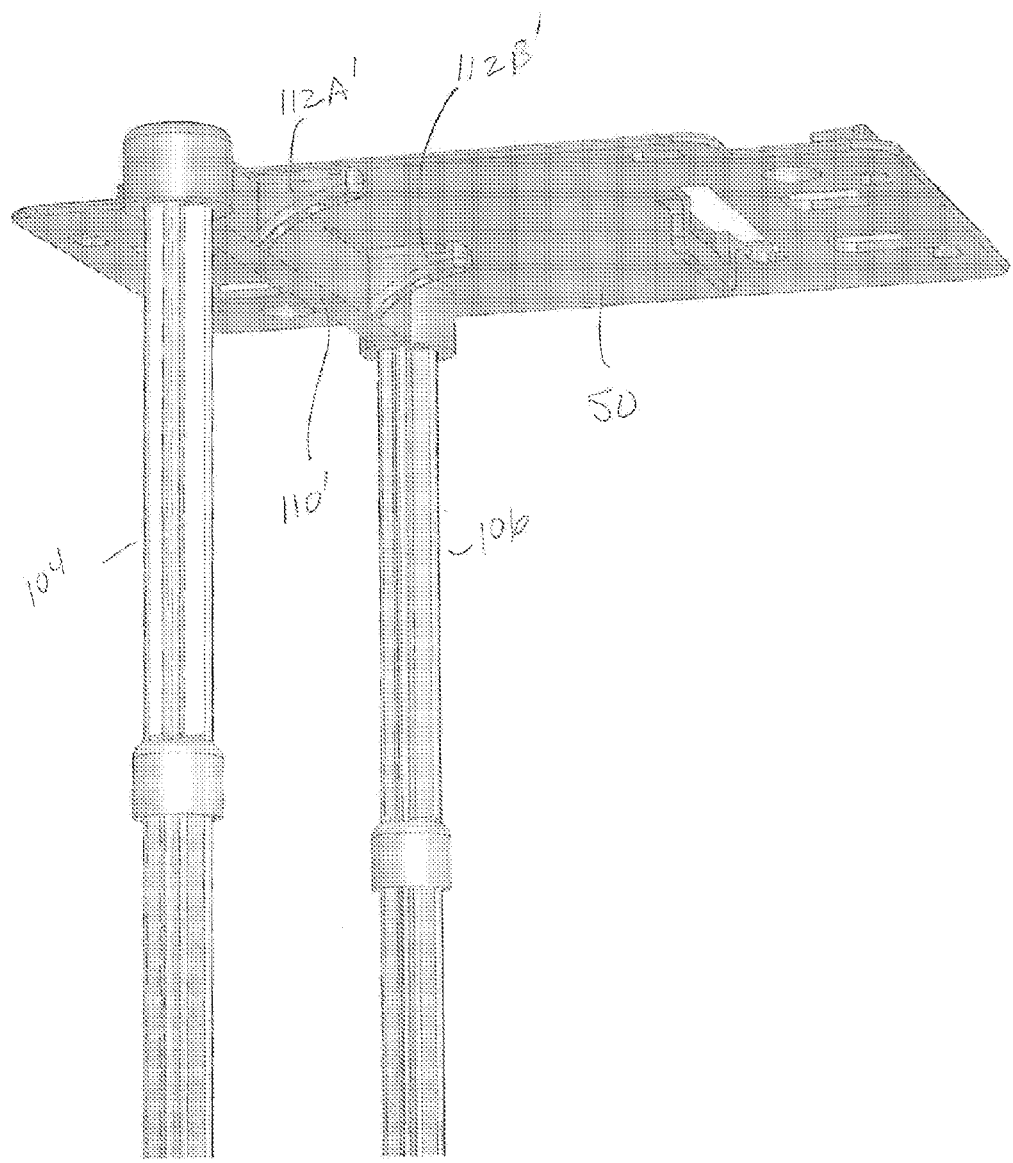

FIGS. 8A-8C illustrate another embodiment of a stand system 100' for supporting the tablet holder and tablet in a horizontal position, e.g. for image capture of a document supported in the box 102. This system is similar to the system of FIG. 7, except that the lateral bracket member 110' includes hook feature 116' protruding from the back side of the bracket member and configured to extend through the slot formed in the stand-off foot structure 86B of the tablet holder 50, and has lateral supports 112A' and 112B' extending from the front side of the bracket member. The hook member keeps the holder in place and prevents tipping, as do the lateral supports.

Although the foregoing has been a description and illustration of specific embodiments of the subject matter, various modifications and changes thereto can be made by persons skilled in the art without departing from the scope and spirit of the invention.

What is claimed is:

1. A holder for a tablet device, comprising:
   a base plate structure having cleats on opposed sides of the base plate structure and a stop surface extending from a top surface of the base plate structure, the cleats on the opposed sides spaced apart by a distance wider than a width dimension of the tablet device with the cleat underside spaced above the top surface by a second distance which is larger than a height dimension of the tablet device; and
   a mounting system configured to mount the tablet device to the base plate structure, the system including the cleats, the stop surface and a spacer configured to fit between the top surface of the base plate structure and a bottom surface of the tablet device; and
   wherein the tablet device has an area footprint, and the base plate structure includes handle surfaces at areas outside the tablet area footprint to facilitate handling the tablet device during use, and to facilitate ambidextrous handling.

2. The holder of claim 1, wherein the handle surfaces include a plurality of spaced openings to accommodate suspension of the holder by engagement of a suspending structure with one or more of the spaced openings.

3. The holder of claim 1, wherein grabber pads are attached to tablet contacting surfaces of the cleats, to hold the device securely, and the spacer fits between the top surface of the base plate structure and the bottom surface of the tablet device to create device contact with the grabber pads.

4. The holder of claim 3, wherein the grabber pads include an adhesive layer on one side to attach to the tablet contacting surfaces of the cleats.

5. The holder of claim 1, wherein the base plate structure is a unitary one-piece structure.

6. The holder of claim 1, wherein the spacer is a thin flat plate.

7. The holder of claim 1, wherein the base plate structure further includes a bottom surface, and a plurality of standoff structures protruding from the bottom surface.

8. The holder of claim 1, wherein the stop surface is defined by a wall portion extending from the top surface of the base plate structure.

9. A holder for a tablet device, comprising:
- a base plate structure having cleats on opposed sides of the base plate structure and a stop surface extending from a top surface of the base plate structure, the cleats on the opposed sides spaced apart by a distance wider than a width dimension of the tablet device with the cleat underside spaced above the top surface by a second distance which is larger than a height dimension of the tablet device; and
- a mounting system configured to mount the tablet device to the base plate structure, the system including the cleats, the stop surface and a spacer configured to fit between the top surface of the base plate structure and a bottom surface of the tablet device; and
- wherein the spacer is a tapered shim.

10. A holder for a tablet device, comprising:
- a base plate structure having cleats on opposed sides of the base plate structure and a stop surface extending from a top surface of the base plate structure, the cleats on the opposed sides spaced apart by a distance wider than a width dimension of the tablet device with the cleat underside spaced above the top surface by a second distance which is larger than a height dimension of the tablet device; and
- a mounting system configured to mount the tablet device to the base plate structure, the system including the cleats, the stop surface and a spacer configured to fit between the top surface of the base plate structure and a bottom surface of the tablet device; and
- wherein the spacer includes a protruding tab portion configured to allow a user to grasp the tab while the spacer is in place between the tablet device and the base plate structure to facilitate removal of the spacer and the tablet device from the holder.

11. A holder for a tablet device, comprising:
- a base plate structure having a top surface, a plurality of cleats on opposed sides of the base plate structure protruding from the top surface, and a stop surface extending from the top surface, the cleats on the opposed sides spaced apart by a distance wider than a width dimension of the tablet device with the cleat underside spaced above the top surface by a second distance which is larger than a height dimension of the tablet device, the plurality of cleats and the stop surface configured to allow the tablet device to be positioned on the base plate structure between the plurality of cleats into abutment with the stop surface; and
- a friction mounting system configured to mount the tablet device to the base plate structure, the system including the cleats, the stop surface and a removable spacer structure fitted between the top surface of the base plate structure and a bottom surface of the tablet device; and
- wherein the base plate structure includes handle surfaces at areas outside a tablet footprint area on the holder to facilitate handling the tablet device and holder during use.

12. The holder of claim 11, wherein the handle surfaces include a plurality of spaced openings to accommodate suspension of the holder by engagement of a suspending structure with one or more of the spaced openings.

13. The holder of claim 11, wherein elastomeric grabber pads are attached to tablet contacting surfaces of the cleats, and the spacer structure fitted between the top surface of the base plate structure and the bottom surface of the tablet device is configured to create device contact with the grabber pads, and wherein a top surface of the tablet device is frictionally engaged with the grabber pads and the bottom surface of the tablet device is frictionally engaged with the spacer structure.

14. The holder of claim 11, wherein the spacer structure is a thin flat plate or a tapered shim.

15. The holder of claim 11, wherein the base plate structure has at least one through opening aligned with a camera lens or microphone of the tablet device.

16. The holder of claim 11, wherein the base plate structure further includes a bottom surface, and a plurality of standoff structures protruding from the bottom surface.

17. The holder of claim 11, wherein the stop surface is defined by a wall portion extending from the top surface of the base plate structure.

18. A holder for a tablet device, comprising:
- a base plate structure having a top surface, a plurality of cleats on opposed sides of the base plate structure protruding from the top surface, and a stop surface extending from the top surface, the cleats on the opposed sides spaced apart by a distance wider than a width dimension of the tablet device with the cleat underside spaced above the top surface by a second distance which is larger than a height dimension of the tablet device, the plurality of cleats and the stop surface configured to allow the tablet device to be positioned on the base plate structure between the plurality of cleats into abutment with the stop surface; and
- a friction mounting system configured to mount the tablet device to the base plate structure, the system including the cleats, the stop surface and a removable spacer structure fitted between the top surface of the base plate structure and a bottom surface of the tablet device, wherein the spacer structure is a thin flat plate or a tapered shim; and
- wherein the spacer structure includes a protruding tab portion configured to allow a user to grasp the tab while the spacer structure is in place between the tablet and the base plate structure to facilitate removal of the spacer structure and the tablet device from the holder.

* * * * *